UNITED STATES PATENT OFFICE.

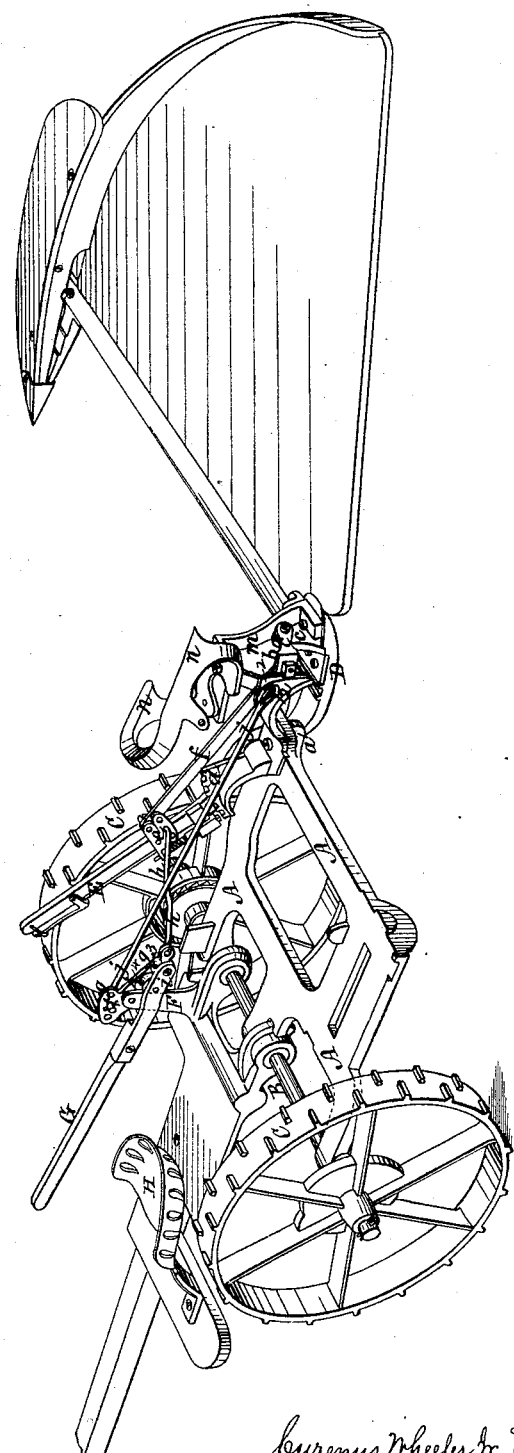

CYRENUS WHEELER, JR., AND HENRY J. CASE, OF AUBURN, NEW YORK; SAID CASE ASSIGNOR TO SAID WHEELER, JR.

IMPROVEMENT IN MOWING-MACHINES.

Specification forming part of Letters Patent No. 163,709, dated May 25, 1875; application filed December 16, 1873.

*To all whom it may concern:*

Be it known that we, CYRENUS WHEELER, Jr., and HENRY J. CASE, both of Auburn, in the county of Cayuga and State of New York, have invented certain new and useful Improvements in Harvesting-Machines; and that the following is a full, clear, and exact description of the same, reference being had to the accompanying drawing making a part of this specification, in which—

Figure 1 represents, in perspective, so much of a harvesting-machine as will illustrate our invention.

Our invention consists in combining, with a hinged main frame and a hinged finger-bar, a lifting and tilting mechanism, by means of which the driver or operator, by a single movement of one lever, may both tilt the cutting apparatus toward and from the ground, and raise it up above the ground bodily, as will be explained.

To enable others skilled in the art to make and use our invention, we will proceed to describe the same with reference to the drawings.

The rear portion of the main frame is shown at A. It is supported on the main axle B, carried in the usual way on the wheel C. To the rear grain-side of the main frame is pivoted, as at *a*, a coupling-piece, *b*, to which the inside shoe D is pivoted by means of lugs *c*, (the rear one only being shown,) so that the shoe and the cutting apparatus, grain-table, and other appliances, usually connected therewith, may move about said pivoted connections as a center. There is pivoted to the main frame, at *a*, a lever, E, furnished with a spring hand-bolt, by which said lever may be locked to, or unlocked from, a toothed arc, *d*, in the usual way and for the usual purpose. To a cross-head, *e*, fastened to the lever E, there is fastened one end of a link or bar, *f*, the other end of which is fastened to the free or rear end of the pivoted coupling-piece *b*, so that said coupling-piece, the shoe, and parts connected to, or carried by, said shoe, may be moved about the center *a* through or by means of the lever E. To a stationary upright, F, fast on the front portion of the main frame, there is pivoted a crank lever or arm, *g*, and at or near the end of the long arm of this crank-lever there is pivoted, as at *i*, a lever, G, which extends forward so as to be easily grasped by the operator in his seat H. The extreme end of the long arm of the crank-lever *g* is linked to the cross-head on the lever E by a connecting-rod, *h*, so that the two levers E and G are thus connected together. From the short arm of the crank-lever *g* there extends a rod, *j*, having a loop or eye at its rear end, which hitches over a hook or stud, 2, at the rear end of the rear main frame A, so that by operating the lever G the finger-bar, cutting apparatus, platform, and rake or reel, when the latter are used, are not only moved about the center *a*, to incline the points of the guards more or less toward or from the ground, but as the rear main frame is lifted at the same time, or by the same operation, they are raised or lowered bodily in regard to the ground. On the end of the lever G, where it is pivoted to the crank-lever *g*, there is a segmental flange, 3, which partially surrounds a hub on the crank-lever, by which means the lever G has a slight movement independent of said crank-lever, until the flange on the main lever comes against a stop on the crank-lever, and then they move together. On the lever G there is a friction-roll, 4, which, when said lever is operated both to lift and to tilt the finger-bar and its appendages, comes against the rigid upright F, as seen in the drawing, and then said upright becomes the fulcrum of both the lever G and the crank-arm *g*, and the lifting and tilting are simultaneously accomplished. When the two levers E and G are connected for joint operation, as above mentioned, the spring-bolt of the lever E is locked up out of action with its toothed arc *d*, and when the lever G is drawn down into a horizontal position, in the act of raising and tilting the cutting apparatus and its appendages, it will remain and hold in that position without other fastening than the line of strain in regard to the pivots and supports.

We have shown a rake-stand, *m*, attached to the shoe D, and a camway, *n*, mounted thereon for operating a combined rake and reel, should it be required.

Having thus fully described our invention, what we claim as new, and desire to secure by Letters Patent, is—

The combination of the two levers E G, and crank-arm $g$, with the links connecting them with each other, and with the main frame and cutting apparatus, substantially as described, so that by the operation of the lever G the cutting apparatus may be raised and tilted at one and the same time.

C. WHEELER, JR.
       H. J. CASE.

Witnesses:
 CHAS. O'BRIEN,
 THOS. TOWNE.